(12) United States Patent
Webster et al.

(10) Patent No.: US 11,910,952 B2
(45) Date of Patent: Feb. 27, 2024

(54) CUSTOMIZABLE MULTIPLE PORT AUTOMATED BEVERAGE BREWER AND SYSTEM

(71) Applicant: Newco Enterprises, Inc., St. Charles, MO (US)

(72) Inventors: Joseph P. Webster, St. Charles, MO (US); Jody G. Jacobsen, Defiance, MO (US); David L. Brandsma, St. Charles, MO (US); Thomas Liebe, Thun (CH)

(73) Assignee: NEWCO ENTERPRISES, INC., St. Charles, MO (US)

( * ) Notice: Subject to any disclaimer, the term of this patent is extended or adjusted under 35 U.S.C. 154(b) by 1022 days.

(21) Appl. No.: 16/626,412

(22) PCT Filed: Jun. 28, 2018

(86) PCT No.: PCT/US2018/040154
§ 371 (c)(1),
(2) Date: Dec. 24, 2019

(87) PCT Pub. No.: WO2019/006216
PCT Pub. Date: Jan. 3, 2019

(65) Prior Publication Data
US 2020/0138230 A1    May 7, 2020

Related U.S. Application Data

(60) Provisional application No. 62/526,334, filed on Jun. 28, 2017.

(51) Int. Cl.
A47J 31/00     (2006.01)
A47J 31/52     (2006.01)
A47J 31/46     (2006.01)

(52) U.S. Cl.
CPC .......... *A47J 31/007* (2013.01); *A47J 31/461* (2018.08); *A47J 31/465* (2013.01); *A47J 31/521* (2018.08); *A47J 31/5251* (2018.08); *A47J 31/5253* (2018.08); *A47J 31/5255* (2018.08)

(58) Field of Classification Search
CPC ...... A47J 31/56; A47J 31/3671; A47J 31/469; A47J 31/30; A47J 31/41; A47J 31/467; A47J 31/002; A47J 31/545; A47J 31/007; A47J 31/521; A47J 31/5251; A47J 31/461; A47J 31/5253; A47J 31/5255; A47J 31/465
USPC .......... 99/275, 280, 281, 283, 288, 290, 295
See application file for complete search history.

(56) References Cited

U.S. PATENT DOCUMENTS

| | | | |
|---|---|---|---|
| 5,285,718 A | 2/1994 | Webster et al. | |
| 6,237,811 B1* | 5/2001 | Ford | A47J 31/401 99/287 |
| 7,234,389 B1 | 6/2007 | Lassota | |
| 2005/0193890 A1 | 9/2005 | Fukushima et al. | |
| 2009/0136632 A1 | 5/2009 | Gutwein et al. | |

* cited by examiner

*Primary Examiner* — Phuong T Nguyen
(74) *Attorney, Agent, or Firm* — Matthews Edwards LLC (57) ABSTRACT

An automatic beverage brewer for coffee, tea, and the like, and more particularly, which is customizable both in physical configuration including number and location of external brewing fonts, optionally in association with a bulk brewing font and receiving container, and in automatic operation to dispense hot water to the respective fonts and a main brewing basket or baskets responsive to user inputted beverage brewing commands.

5 Claims, 12 Drawing Sheets

CUSTOMIZABLE MULTIPLE PORT AUTOMATED BEVERAGE BREWER AND SYSTEM

This application is submitted under 35 U.S.C. 371 claiming priority to PCT/US2018/40154, filed Jun. 28, 2018, which application claims the benefit of U.S. Provisional Application No. 62/526,334, filed Jun. 28, 2017.

TECHNICAL FIELD

This invention relates generally to an automatic beverage brewer for coffee, tea, and the like, and more particularly, which is customizable both in physical configuration including number and location of external brewing fonts, optionally in association with a bulk brewing font and receiving container, and in automatic operation to dispense hot water to the respective fonts and a main brewing basket or baskets responsive to user inputted beverage brewing commands.

BACKGROUND ART

U.S. Provisional Application No. 62/526,334, filed Jun. 28, 2017, is incorporated herein by reference in its entirety.

Coffee shops, restaurants, and the like, have increased the variety of brewed beverage offerings, as well as the complexity of the brewing process. Beverage preparers and baristas often have their own recipes and processes for preparing particular brewed beverages. This can include both individual servings such as cups, insulated mugs and jugs, smaller multiple serving containers such as carafes, and larger servings such as urns, decanters, and the like. Variables from the brewer perspective can include, but are not limited to, hot water flow rate or rates and/or interruptions in hot water dispensing during the brewing process, volume, and agitation of grounds, leaves, distribution within the brew basket or filter, etc. For example, when brewing a batch of coffee in a chemex carafe, typically utilizing a conical filter held in a tapered opening of the carafe that extends downwardly convergingly toward a reduced diameter neck above a brewed coffee receiving and holding container, it is a common practice to first add only sufficient hot water to moisten the grounds contained in the filter, wait some time, e.g., 20 to 40 seconds, and then add additional hot water to complete the brewing operation. Chemex carafes can hold, for example, 3 cups, 6 cups, 8 cups or 10 cups, so the amount of added hot water can vary widely. The filter may have less volume than the amount of coffee to be brewed, and thus may need to be added at a rate that allows some of the coffee to seep through the filter before additional hot water is added, to avoid overfilling and/or to effect water absorption into and/or extraction of flavor from the grounds. The additional hot water can also be added at a rate to achieve a desired extraction/flavor, and/or sporadically to agitate the grounds and/or create turbulence, for achieving a desired extraction/flavor, all of which typically being done manually.

Coffee shops and restaurants are under pressure to increase productivity, particularly in markets with mandatory minimum wages, and popular baristas are under pressure to prepare as many beverages as possible during peak times, such as breakfast, lunch, and dinner rush hours, airport and rail boarding and disembarking, deplaning times, and the like. To meet these increased demands, automated beverage brewing apparatus that can store brewing flow rates and volumes for particular beverage recipes have been developed, including for individual servings. However, other than to provide multiple simultaneous bulk brewing, e.g., decanters, urns, etc., and/or to provide a manually operable hot water tap dispenser for tea and the like, there is not a known advancement that provides the capability to simultaneously custom brew multiple beverages. The market also lacks an advancement that provides customized configuration of a multiple font brewer, including in number and location of brewing locations. In this regard, it is foreseen that it would be desirable to have a commercial brewer that provides a bulk brewing station configured to brew a large vessel or urn of coffee, tea, etc., and multiple auxiliary brewing locations for individual and/or smaller volume multiple serving vessels such as carafes, small decanters, cups, and the like. However, high quality beverage brewing can require exacting temperature water heated just a few degrees lower than boiling, delivered at a precise flow rate. If multiple brewing operations simultaneously draw hot water from a single tank or reservoir, problems that can occur include that timed valve operation may not deliver proper flow rate or volume, stoppage of one dispensing operation may cause diversion of flow to another, all of which can result in improper beverage concentration, e.g., dilution, too strong, too weak, inconsistent, etc.

Beverage brewers are utilized in a variety of locations on counters, shelves, etc., and it may be desired or necessary to configure for use from one side or the other.

Thus, what is sought is an improved manner of automated preparing of brewed beverages that overcomes one or more of the shortcomings and limitations set forth above.

SUMMARY OF THE INVENTION

What is disclosed is an automatic beverage brewer for coffee, tea, and the like, customizable either or both in physical configuration including number and location of external brewing fonts, and in automatic operation to dispense hot water to the respective fonts and a main brewing basket or baskets, responsive to user inputs, that overcomes one or more of the shortcomings and limitations set forth above.

According to a preferred aspect of the invention, the beverage brewer includes an upstanding base structure having a front and opposite sides, including optionally mounted so as to extend sidewardly from one or both sides, an arm or arms extending sidewardly from the base structure, supporting one or more hot water dispensing or brewing fonts, at suitable spacing for accommodating desired brewing vessels therebelow, e.g., a distance equal to at least about one fourth of a width of the base structure between the adjacent hot water dispensing fonts. The base structure contains or carries a tank for receiving and holding a volume of water, at least one inlet port for receiving water from a water source into the tank, and preferably at least three dispensing ports connected to the tank in spaced relation to the at least one inlet port and through which the water can be dispensed from the tank, respectively. The brewer has an automatically thermostatically controlled heat source disposed and operable to heat the water in the tank to a specified temperature. A plurality of hot water dispensing valves are preferably disposed within or on the base structure, and are fluidly connected to selected ones of the dispensing ports, respectively, including at least an automatically controllable first hot water dispensing valve connected to a first of the dispensing ports and an automatically controllable second hot water dispensing valve connected to a second of the dispensing ports.

According to another preferred aspect of the invention, a first water line on or within the base structure fluidly connects the first hot water dispensing valve to a hot water dispensing font or outlet above a brewing basket for a bulk brewing device disposed on the base structure. A second water line extends externally of the base structure and fluidly connects the second hot water dispensing valve to a hot water dispensing or brewing font disposed on the arm distally of the base structure. Additional water lines are provided for the number of fonts used.

As another preferred aspect of the invention, the beverage brewer can be configured as modular, to allow installing an arm carrying one or more hot water dispensing fonts, on either or both sides of the base structure, with the associated hot water dispensing valves being installed internally within the base structure, in fluid connection with the dispensing ports on the hot water holding tank, and with the water lines extending from the hot water dispensing valves through and from the base structure to their associated dispensing fonts, respectively. As a result, the automatic brewer of the invention can be configured to have one or more additional hot water dispensing or brewing fonts on one or both sides of the base structure, as desired or required for a particular application.

According to another preferred aspect of the invention, the brewer includes a computerized controller including at least one processor and a memory, that controllably connects to the hot water dispensing valves and which in turn is controllable responsive to inputted and/or programmed commands to open and close the hot water dispensing valves, respectively. At least one computerized operator or user interface is incorporated with or connects to the computerized controller and includes an input device such as a touch pad, keypad, or the like, and a display, to allow a user or operator to input programming and/or beverage brewing commands, and can include additional memory, the controller and operator or user interfaces being operable to store program commands and to recall and execute them responsive to later inputted beverage brewing commands, to automatically control the respective hot water dispensing valves to dispense selected amounts, and optionally rates and timing, of the hot water for brewing beverages corresponding to the program commands.

According to another preferred aspect of the invention, the brewer includes at least two of the computerized operator interfaces, and they can be disposed at the same or different locations on the base structure, as a non-limiting example, on the front of the base structure, and one on an arm.

According to another preferred aspect of the invention, a first of the computerized operator interfaces is configured to only control the first hot water dispensing valve, and a second of the computerized operator interfaces is configured to control the second hot water dispensing valve and any additional ones of the hot water dispensing valves. Thus, as a non-limiting example, a brewer of the invention could include one or more sideward extending arms each including one or more brewing fonts. As can be seen in the accompanying illustrations, the brewing fonts will be disposed such that brewing containers such as, but not limited to, tea brewers, Chemex brewing carafes or vessels, cups, mugs, jugs, and the like can be placed under the respective fonts for receiving the hot water therefrom. The computerized operator interfaces can be programmed by an operator for dispensing a quantity or volume of the hot water, and/or a particular flow rate or rates, interruptions, pauses, etc., for performing a particular brewing operation. As a non-limiting example, for an 8 cup Chemex carafe, an operator interface can be programmed to dispense an amount of hot water for moistening the grounds contained in the filter above the carafe, then pausing or interrupting the hot water delivery for a programmed period, and resuming to dispense the hot water to a desired quantity, e.g., 40 fluid ounces or a certain level, optionally at a selectable flow rate or rates, from an available, selected, or selectable font on any of the arms. Individual operators or users can develop and store personal brewing recipe programs, which can be named, and recalled from the memory, then executed, as desired. The interfaces can also be programmed to allow accessing particular recipes only after inputting a password or biometric.

As another preferred aspect, the computerized operator interfaces can comprise local devices such as a touch pad, or mobile devices, such as cellular phones, tablets, and other computerized communication devices, that can communicate with the brewer controller via any suitable communications path, such as, but not limited to, a wired or wireless network, Bluetooth, near field communication link, or the like. Still further, the interface or interfaces can be configured to be operable for controlling any of the hot water dispensing valves, or only a certain valve or valves, for instance, located on a particular arm, or on the base structure. Thus, it can be envisioned that a brewer could be set up so that one operator interface controls brewing fonts on one side of the brewer, and another operator interface controls brewing fonts on the other, and an additional option would be for one of the operator interfaces to control only the first or bulk brewing hot water valve, for controlling brewing of large volumes. Individual operators can retain their own operator interfaces, and install them when they work, to access their proprietary stored brewing commands, then remove their operator interface when they leave the workplace.

As an additional preferred aspect, each of the hot water dispensing valves or additional valves can be connected to a pressurized air source and configured to generate a flow of pressurized air through the associated hot water line to purge it of hot water after dispensing, or to dispense pressurized air at desired times such as just as a portion of the hot water is being dispensed, to effect an agitation of the grounds, for achieving a desired brewing result.

DETAILED DESCRIPTION OF PREFERRED EMBODIMENTS OF THE INVENTION

Referring now to the drawings, in FIGS. 1-16 preferred embodiments of a customizable multiple port automatic beverage brewer 20 of a system of the invention are shown. In FIGS. 1-7 a base structure 22 of brewer 20 is illustrated, which as will be explained, comprises a generally rectangular housing 22 of sheet metal and or plastics construction, carrying internally or comprising a hot water holding tank 26 (see FIGS. 14 and 15). As shown in additional FIGS. 8-14, base structure 22 can be modularly configured to support one or more individual hot water dispensing fonts 28 at desired locations, including preferably a central bulk brewing hot water dispensing font 28, and one or more auxiliary hot water dispensing fonts 28 at desired side locations. Each individual hot water dispensing font 28 has an associated hot water dispensing valve 30 controlled by a computerized controller 32, for delivering a desired quantity of hot water to an associated brewing container. Here, a bulk brewing hot water font 28 is disposed over a bulk brewing basket 34 disposed above a bulk brewing platform 36. A bulk brewing container 38 that can comprise a large capacity insulated serving urn or decanter, as non-limiting examples (see FIGS. 8-12 and 15), is shown on platform 36 for receiving the brewed beverage from basket 34 in the well known manner. Variously additional auxiliary hot water dispensing fonts are provided for dispensing hot water variously into other brewing containers, here non-limitingly exemplified by chemex carafes 40, a larger jug 42, and a small container 44 (see FIG. 15). As an optional alternative, the hot water can be supplied from another source, such as a hot water line, instant hot water heater, boiler, or the like, having an appropriate interface, such as a manifold, for connection of the individual hot water dispensing valves 30.

The base structure 22 as illustrated in FIGS. 1-7 serves as a central component of the modular automatic beverage brewer 20, onto which the other components can be easily mounted as desired or required for a particular application and/or configuration. For this purpose, base structure 22 includes opposite side panels 46 and 48 of sufficient strength and rigidity for attachment of upstanding arm supports 50 and 52, respectively, configured for supporting sideward extending arms 54 and 56 as shown in FIGS. 8 and 10-14, which in turn support a desired number of hot water dispensing fonts 28 at a convenient height above a platform such as a counter or table on which base structure 22, will be located, to accommodate placement of various brewing containers beneath fonts 28 for receiving hot water therefrom, as will be explained. Thus, as a nonlimiting example, an arm 54 or 56 can carry one font 28, two fonts 28, or three or more fonts 28, as desired or required for the particular application. Attachment of arm supports 50 and 52, for mounting arms 54 and 56 2 base structure, 22 can be accomplished using suitable fasteners, such as sheet metal screws, or the like (not shown), and side panels 46 and 48 can be drilled, or can include appropriate knockouts, covers, or the like, that can be removed from openings, for passage of necessary water lines to arms 54 and 56. Likewise, to reconfigure or remove arms 54 and/or 56, the fasteners can be removed and covers or plugs used to conceal openings, for a finished appearance.

Figure 1:
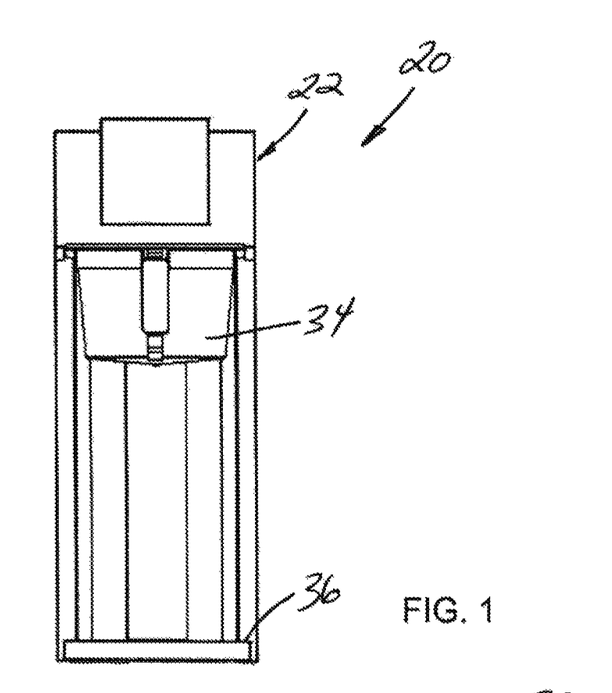
FIG. 1 is a front view of an automatic beverage brewer and system constructed and operable according to the teachings of the present invention.
Figure 2:
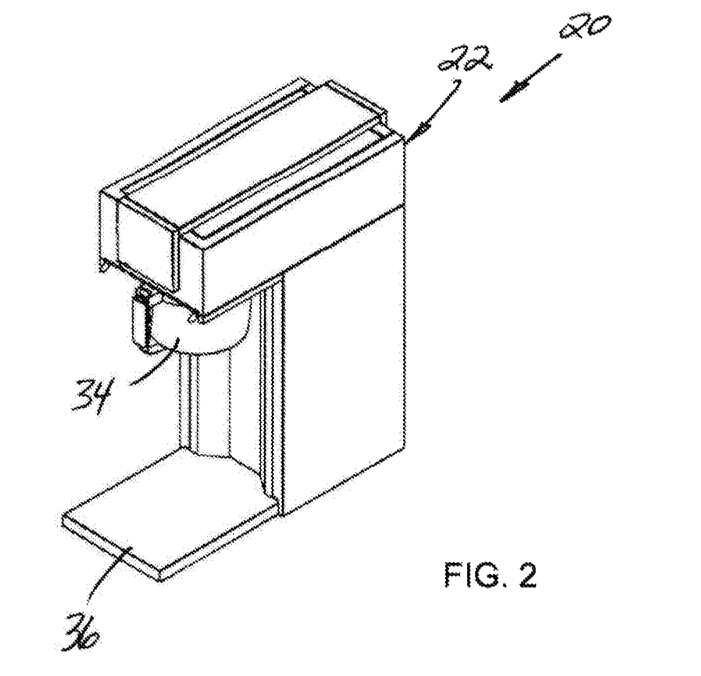
FIG. 2 is a perspective view of the brewer of FIG. 1.
Figure 3:
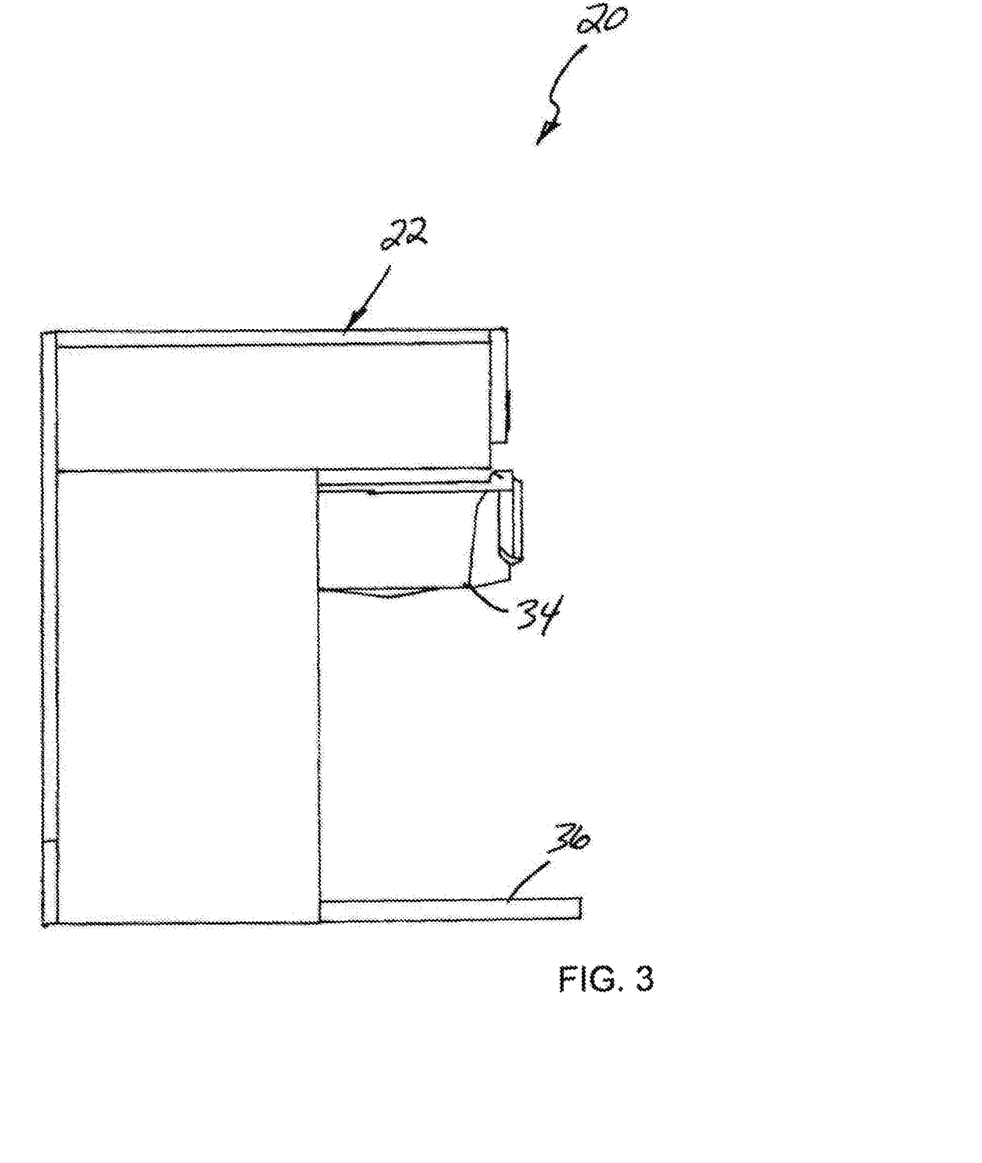
FIG. 3 is a side view of the brewer.
Figure 4:
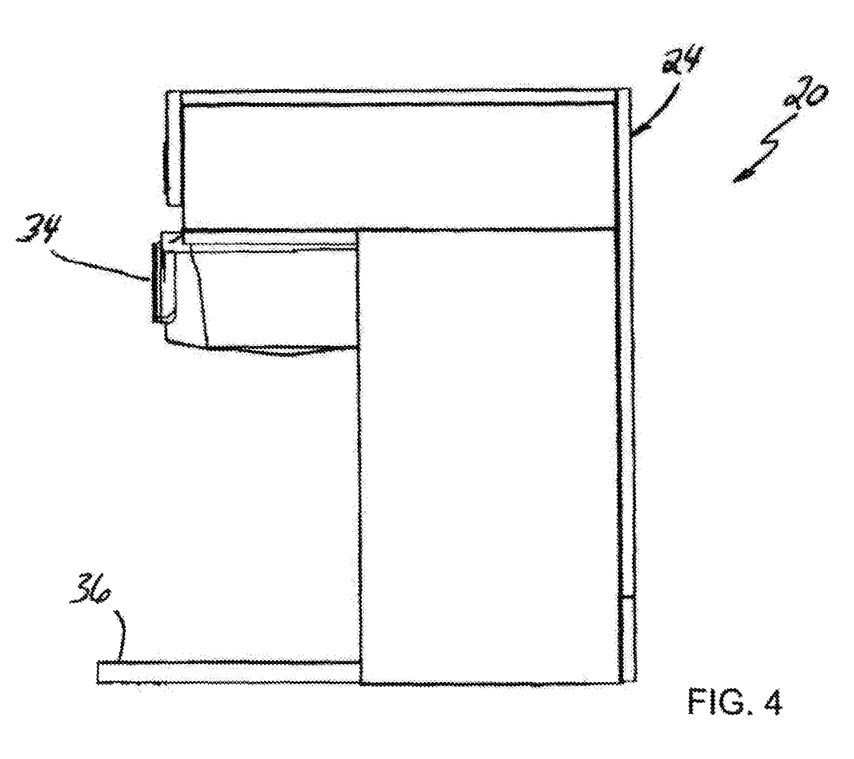
FIG. 4 is another side view of the brewer.
Figure 5:
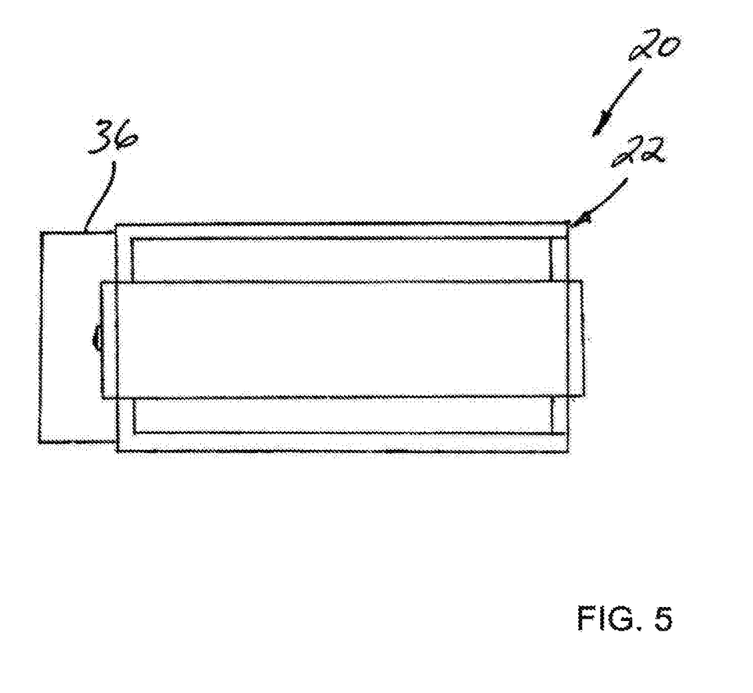
FIG. 5 is a top view of the brewer.
Figure 6:
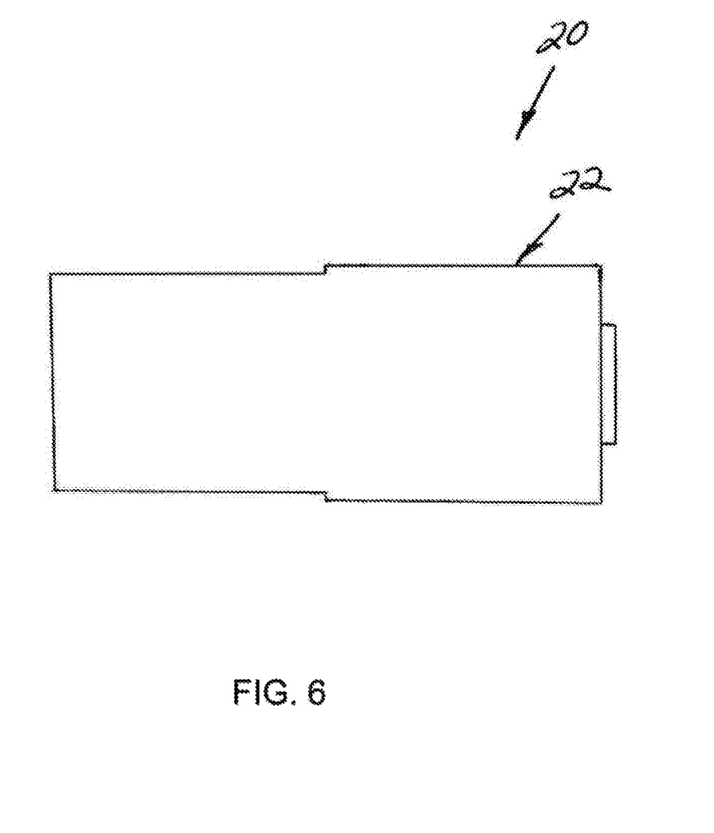
FIG. 6 is a bottom view of the brewer.
Figure 7:
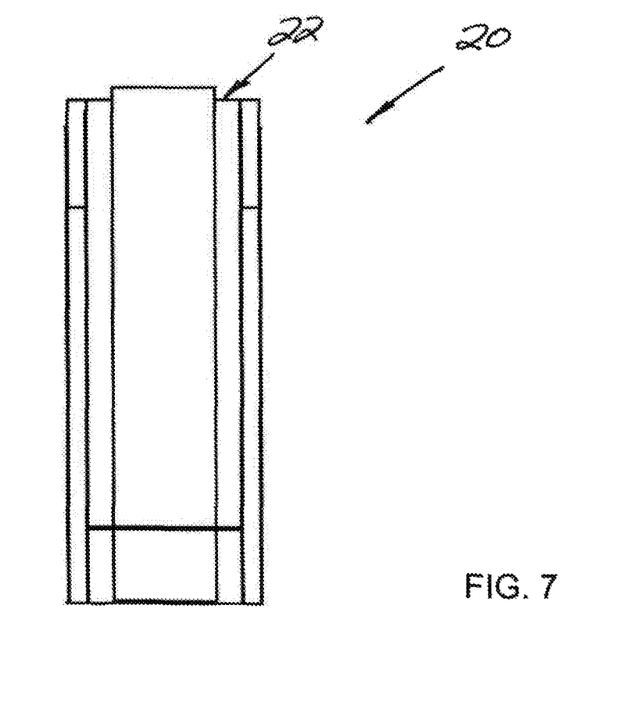
FIG. 7 is a rear view of the brewer.
Figure 8:
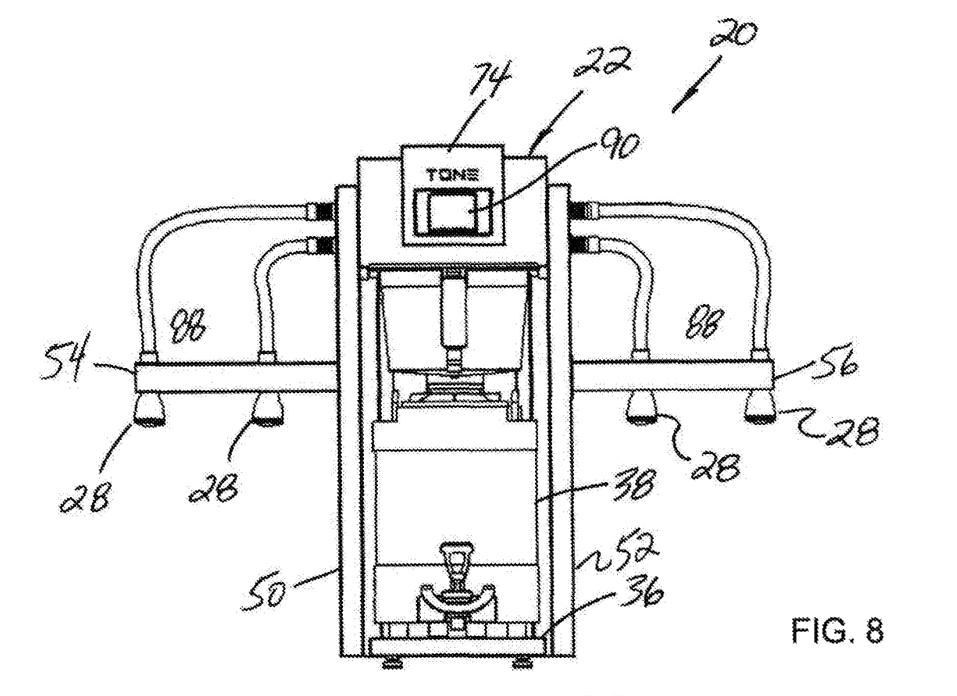
FIG. 8 is a front view of a brewer of the invention, including a bulk brewing container carried on a platform of a base structure and sidewardly extending arms carrying hot water dispensing fonts of the invention.
Figure 9:
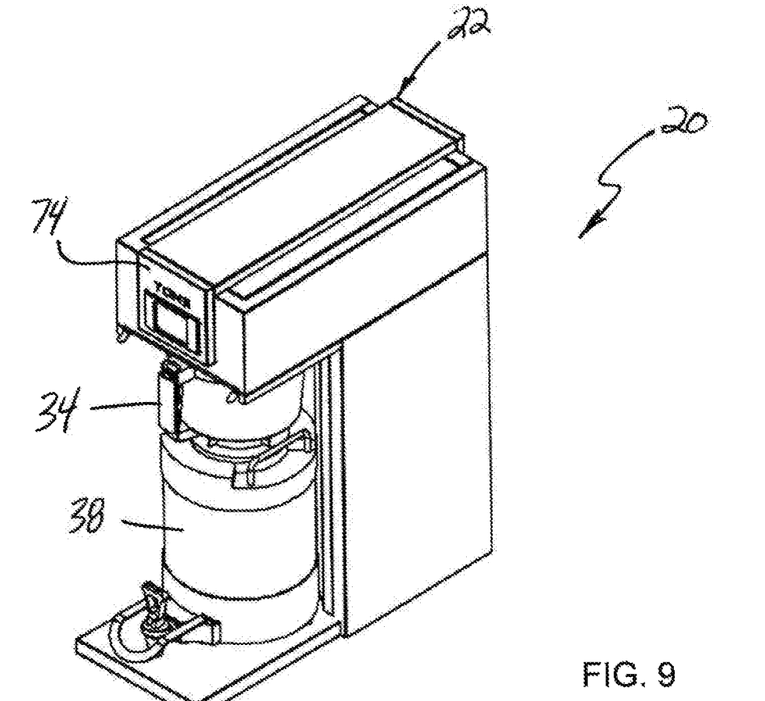
FIG. 9 is another perspective view of the brewer, showing a bulk brewing container on the platform of the base structure.
Figure 10:
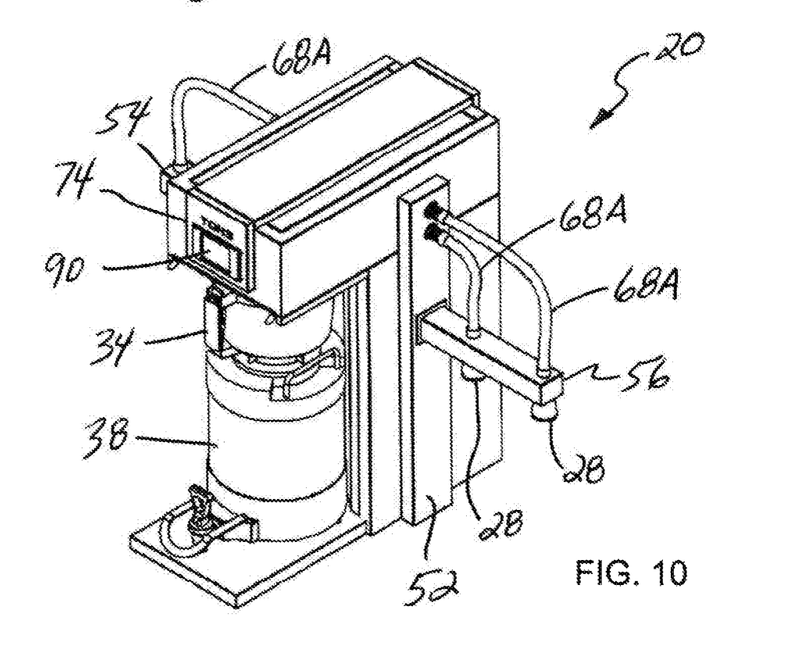
FIG. 10 is another perspective view of the brewer, showing arms carrying auxiliary hot water dispensing fonts extending from the sides of the base structure.
Figure 11:
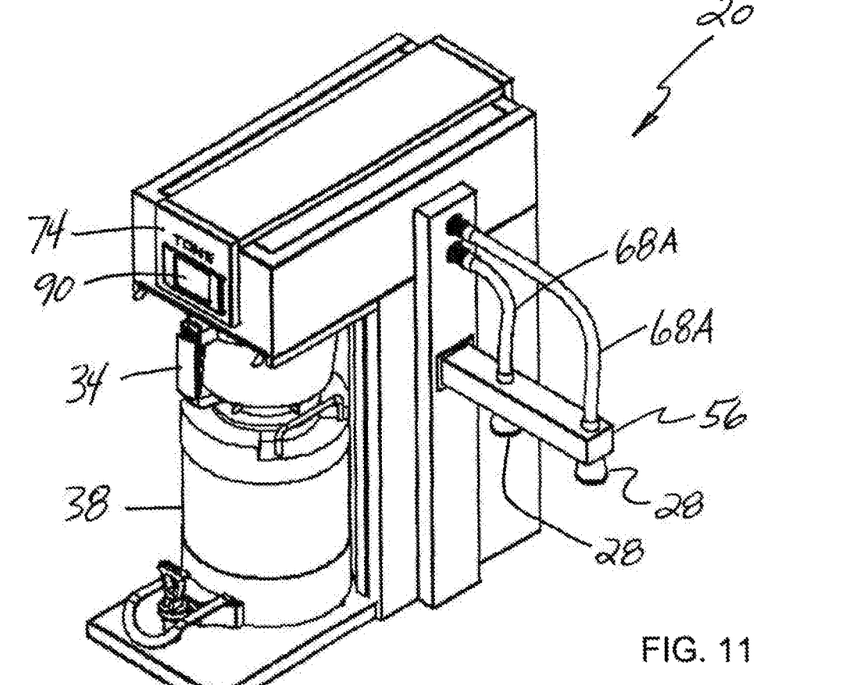
FIG. 11 is another perspective view of the brewer, showing an arm carrying auxiliary hot water dispensing fonts extending from only the near side of the base structure.
Figure 12:
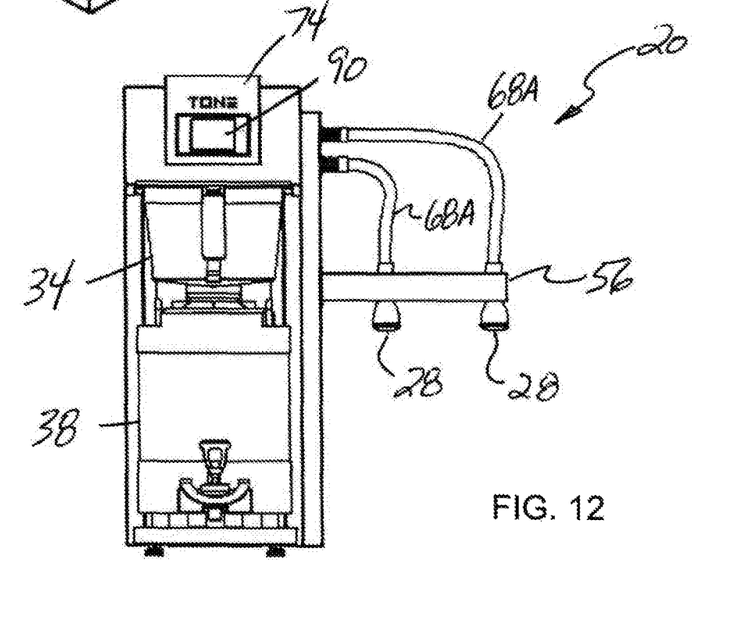
FIG. 12 is a front view of the brewer configured as shown in FIG. 11.
Figure 13:
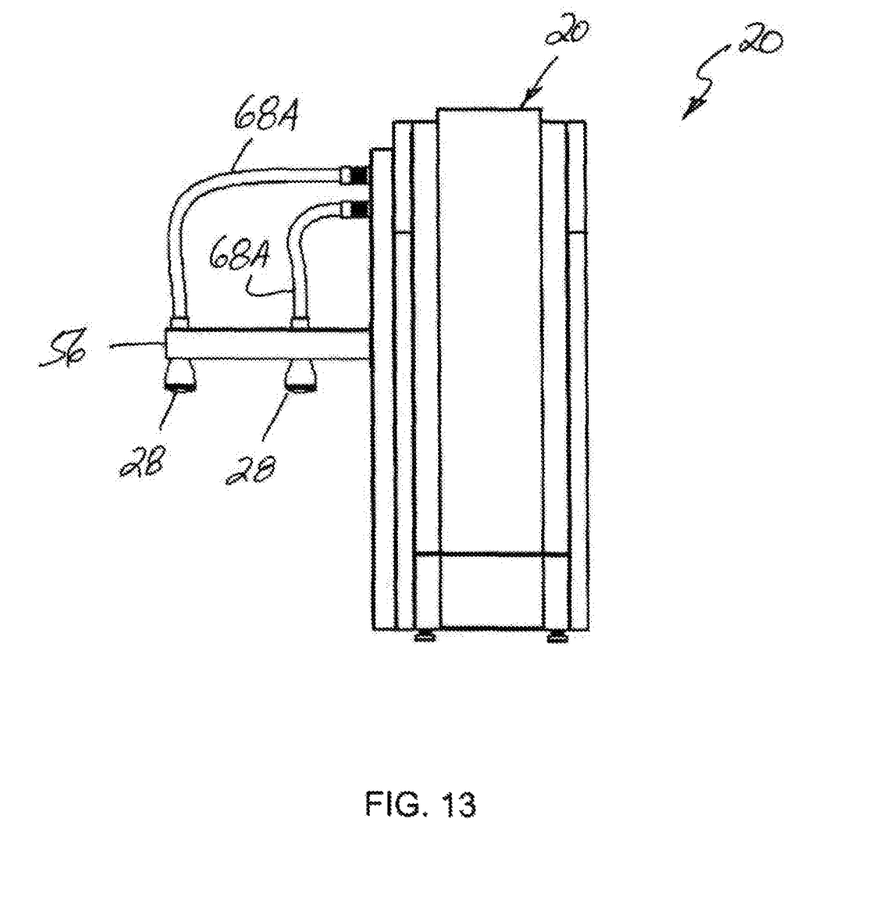
FIG. 13 is rear view of the brewer of FIGS. 11 and 12.
Figure 14:
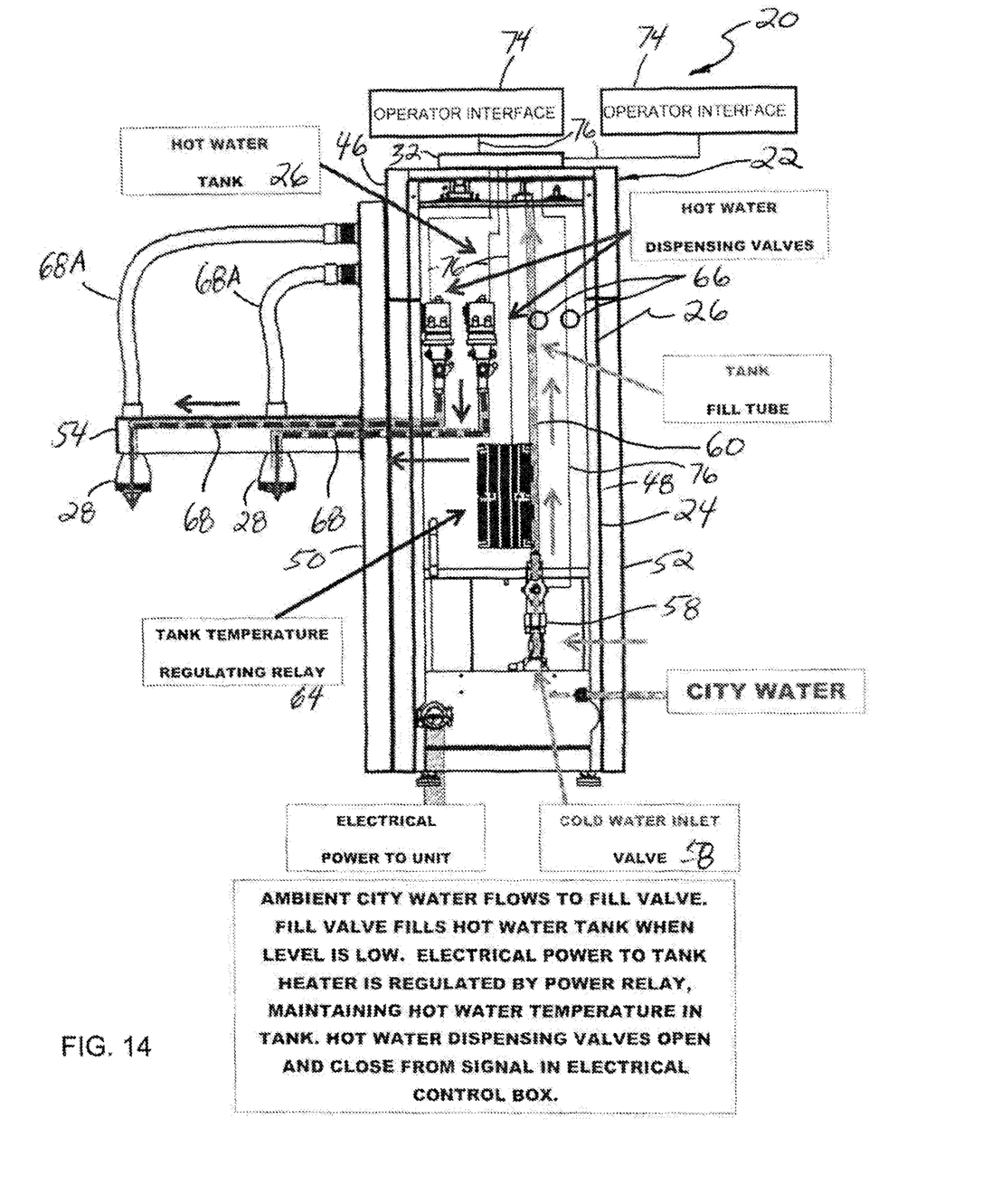
FIG. 14 is a simplified layout representation of the brewer and system of the invention, showing one embodiment of an arrangement of aspects of the invention on and in a base structure thereof.
Figure 15:
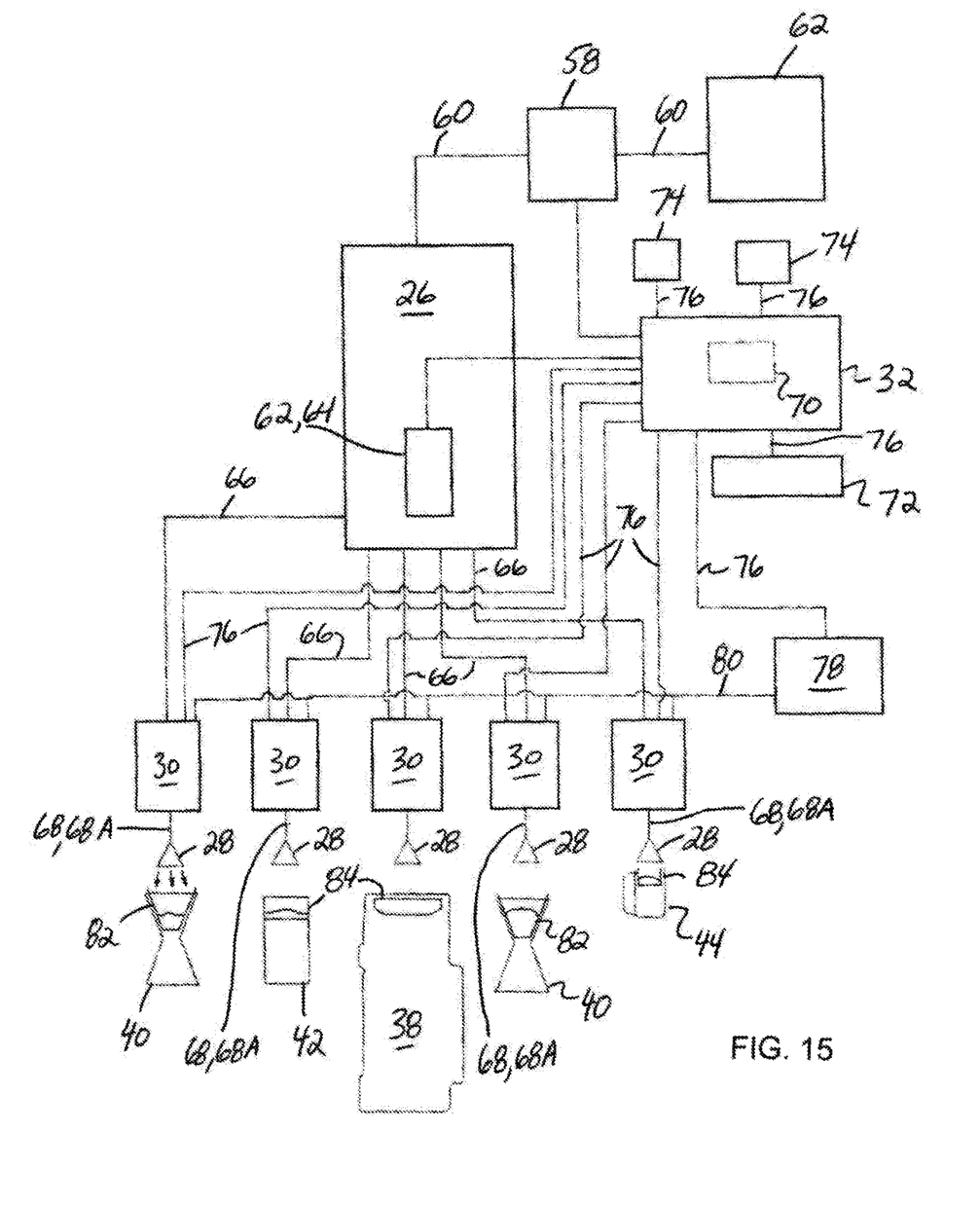
FIG. 15 is a simplified schematic diagram showing aspects of the invention.

Referring in particular to FIG. 14, as a basic preferred configuration, housing 24 of base structure 22 contains or comprises hot water holding tank 26, which will be of sufficient capacity to hold hot water for filling multiple brewing containers, for example, one or more multiples of the volume of a bulk brewing container and several additional brewing containers, so that during busy times, adequate hot water is present for brewing sufficient quantities of beverages to fill the bulk brewing container and several other brewing containers. In this regard, tank 26 will be connected to city water or another suitable water source 62, using desired or required filters or purifiers (not shown), via a cold water inlet valve 58 connected to a cold water line 60 that extends upwardly within housing 24 to a top region of tank 26, so that the cold water is delivered to the upper region of that tank, as illustrated by the upwardly directed arrows. Cold water inlet valve 58 can be a manually operated valve normally left open, such that city water pressure will pressurize tank 26 and replenish it immediately as water is dispensed therefrom. Tank 26 also includes a water heater tank temperature regulating relay 64 powered by electricity for a suitable power source such as line current, for rapidly heating the incoming water into tank 26, and maintaining the water at the desired temperature. Here, a temperature just below boiling, as a nonlimiting example, between 190 and 208° F. is preferred.

Tank 26 additionally prefers a number of hot water dispensing ports 66 at a location sufficiently spaced from the water inlet through which the hot water will be dispensed individually to the fonts 28 under control of individual hot water dispensing valves 30. Here, tank 26 as a nonlimiting example 26 can include 5 hot water dispensing ports 66, which will be plugged if not used, and unplugged and connected to a hot water dispensing valve 34, which will be connected individually to a selected hot water dispensing font 28 via an individual water line 68. Water lines 68 will extend as necessary through housing 24 and can either extend internally through the associated arm 54 or 56 to the associated hot water dispensing font 28, or externally to the associated arm 54, 56, as illustrated by the external water lines 68A for delivering the hot water to the associated hot water dispensing font 28, as illustrated by associated arrows. Various ornamentation and materials can be used in the manufacture of water lines 68A as desired or required for a particular appearance.

Hot water dispensing valves 30 are each automatically controlled by computerized controller 30 to control dispensing of hot water from the associated hot water dispensing font 28 into a brewing container located therebelow. Computerized controller 30 comprises at least one processor 70, a memory 72, and at least one computerized operator interface 74, operable to store and execute individualized valve operation commands to selectively open and close the hot water dispensing valves 30 to dispense approximate amounts of the hot water from the hot water holding tank 26 through the hot water dispensing fonts 28, respectively, responsive to inputted beverage brewing commands from the at least one computerized operator interface 74. Controller 32 can be connected to the valves 30, memory 72, and operator interfaces 74, along any suitable conductive paths 76, such as wires of a wiring harness, controller area network, wireless network, or the like.

Controller 32 can also optionally be connected in operative control to a pressurized air source 78 via a suitable conductive path 76, air source 78 being connected to the valves 30 via air line 80, for delivering pressurized air thereto. In turn, valves 30 can be configured to have an operating mode for directing the pressurized air individually through water lines 68 or 68A and through the associated font 28, for purging water from those lines, agitating coffee grounds or other brewable material within an associated filter 82 or brewing basket 84, as part of a programmable custom brewing process.

Controller 32 can additionally optionally be connected to tank temperature regulating relay and heater 64 via conductive paths 76 for receiving information therefrom, such as, but not limited to, water flow or pressure (from an associated pressure transducer), and water temperature, respectively, and for sending commands thereto, such as temperature regulating commands and water flow commands, respectively.

Figure 16:
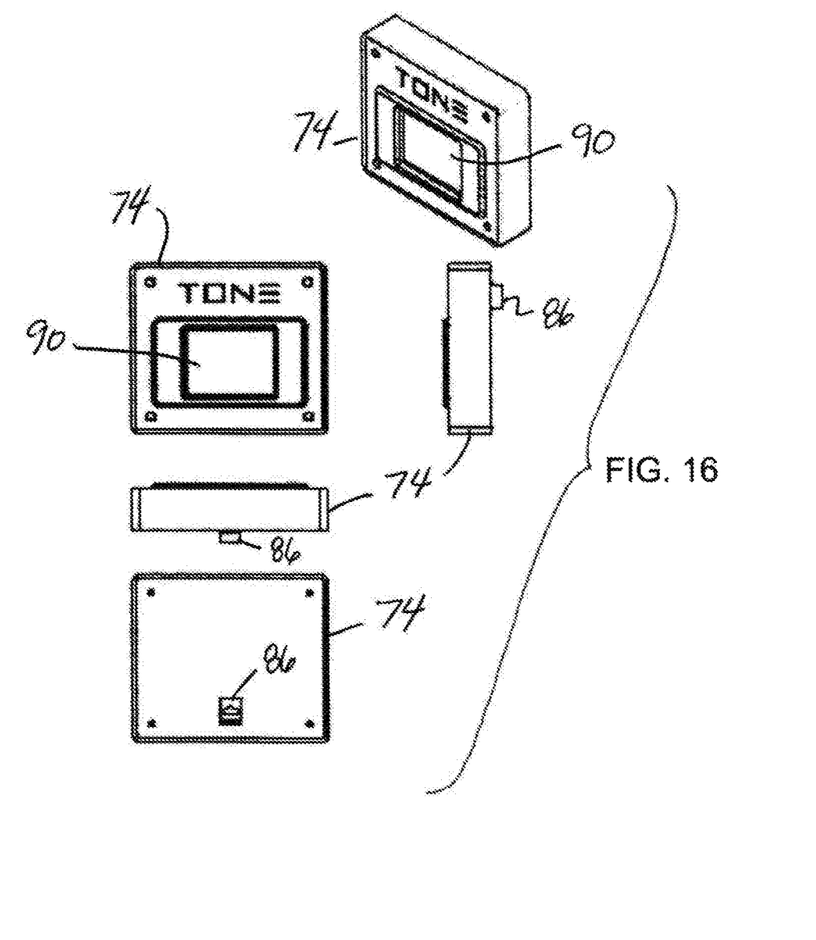
FIG. 16 is several views of a representative computerized operator interface according to the invention.

Controller 32 and one or more of the operator interfaces can be integrated, e.g., into a unit, and can connect to a wiring harness, controller area network or other conductive paths 76 connecting to the various controlled aspects, e.g., valves 30, via suitable standard plug 86, having a mating receptacle at a desired location such as on the top of base structure 22, or a location 88 an arm 54, 56, as desired for an particular application, if wired connection is used. In this way it is envisioned that the operator interface/controller can be retained by individual users/operators, and they can maintain proprietary control over their recipes and customer preferences and the like, and so that they can program recipes and formulas at other locations, such as home, then bring them to one or more work locations, and just plug their individualized operator interface in to the controller network or local controller 32 for use Programming can be accomplished via an input/output 90 integrated with the operator interface which can be, as a nonlimiting example, a touch screen or the like. Additionally, or alternatively, the operator interface may have wired or wireless connectivity via a local area network, near field communication device, Bluetooth device, or the like, to allow programming and performing other tasks remotely, such as selecting and/or inputting a brewing command or order.

Optionally according to the invention, controller 32 can be configured to receive inputs from more than one operator interface 74, and can be programmed to limit the individual operator interfaces 74 to operation with only selected hot water dispensing fonts 28. As a nonlimiting example, one operator interface 74 may be limited to function with selected ones of fonts 28 on one side of brewer 20, for use by one user or operator, and another operator interface 74, may be limited to function with others of the fonts 28. For example, one of the interfaces 74, can be dedicated to a single font 28, and another interface 74, available for use with the remaining fonts 28, so that users do not interfere with each other, or one user, such as a higher skilled barista, can brew more time-consuming artisan beverages. As another example, the central font 28 can be limited for use only with large brewing containers and baskets, or those can be removed to allow use with smaller brewing containers such as carafes and the like. Controller 32 can also be programmed to lock out certain fonts 28, slow the execution of brewing commands, etc., when, for instance, there has been a large consumption of hot water, and there is risk that if too much hot water is immediately used the dispensed water will not be sufficiently hot for desired brewing. In this regard, communication with tank temperature regulating relay and heater 64 can be useful.

The automatic beverage brewer and system 20 of the invention facilitates custom brewing by allowing users to input individual brewing commands in a sequence to achieve a desired result. As nonlimiting examples of parameters that are controllable via the user interfaces 74, brewing commands including selection of particular fonts 28, duration of hot water dispensing, duration of pauses, pulsing, and delivery of pressurized air, can be inputted. Various brewing command formulas can be individually named and stored, and their use can be restricted, password or biometric protected, and the like. The input/output device can also provide information to the user for a particular brewing formula, such as identity of bean or tea, or roast to be used, grinding technique, e.g., French press, burr, etc., brewing or receiving container size selection, filter selection, and the like. Thus, as a nonlimiting example, for a chemex carafe of a particular size, the operator can choose an initial duration of hot water flow to moisten or wet the grounds, then pause for a selectable period, then resume hot water delivery at a selectable rate, or any pulsing or interrupted manner to achieve desired brewing characteristics. If an air source 78 is present, the operator can input commands to purge water lines 68 or 68A at the end of a brewing operation, aerate the hot water being dispensed, or agitate grounds within the filter or basket for desired results, such as better wetting or saturation.

As an option, hot water dispensing valves 30 can be configured to allow constant or varying flow rates. As another option, the hot water dispensing fonts 28 used at different locations can have different characteristics, such as larger, smaller, more, or less, openings, or a particular pattern or angle of openings, e.g., for use with a particular brewing container, for achieving desired brewing results or effects. As still another option, base structure 22 can be configured to support an arm or arms, 54, 56, at different elevations, for use with brewing containers of different heights, if desired.

Thus, according to the invention, it should be envisioned that significant customization and productivity enhancement is achievable, and that multiple users, operators, such as baristas and the like, are able to simultaneously utilize the same brewing apparatus to make individualized brewed beverages of different types, characteristics, and sizes, without interference, delay and other problems, with a wide variety of brewing vessels, such as carafes, cups, mugs, jugs, and the like. As a non-limiting example, for an 8 cup Chemex carafe, an operator interface can be programmed to dispense an amount of hot water for moistening the grounds contained in the filter above the carafe, then pausing or interrupting the hot water delivery for a selectable time period, and resuming to dispense the hot water to a desired quantity, e.g., 40 fluid ounces or a certain level, optionally at a selectable flow rate or rates, from an available, selected, or selectable font on any of the arms. Individual operators or users can develop and store personal brewing recipe programs, which can be named, and recalled from the memory, then executed, as desired. The interfaces can also be programmed to allow accessing particular recipes only after inputting a password or biometric.

In light of all the foregoing, it should thus be apparent to those skilled in the art that there has been shown and described a customizable multiple port automated beverage brewer and system that provides one or more of the advantages and overcomes one or more of the limitations, set forth above. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A customizable automatic beverage brewer, comprising:
   a base structure comprising a hot water holding tank and configured to removably support at least one arm sidewardly extending therefrom to carry multiple hot water dispensing fonts, the hot water holding tank having multiple hot water dispensing ports for individual connection to automatically controlled hot water dispensing valves operable to receive the hot water from the hot water holding tank and connectable to the hot water dispensing fonts, configured to controllably deliver quantities of the hot water thereto, and a computerized controller and memory, connected in operative control of the hot water dispensing valves, programmable for individually controlling the hot water dispensing valves to deliver hot water to the fonts, configured to programmed beverage brewing commands.

2. The customizable automatic beverage brewer of claim 1, further comprising at least one operator interface including an input/output connected to the computerized controller and usable for inputting the beverage brewing commands.

3. The customizable automatic beverage brewer of claim 2, comprising two of the operator interfaces located on the brewer.

4. The customizable automatic beverage brewer of claim 1, comprising two of the arms supported by and extending sidewardly in opposite directions from the base structure and supporting at least one of the hot water dispensing fonts thereon, respectively.

5. The customizable automatic beverage brewer of claim 4, comprising two of the hot water dispensing fonts supported on at least one of the arms.

\* \* \* \* \*